US010648457B2

(12) United States Patent
Novák

(10) Patent No.: US 10,648,457 B2
(45) Date of Patent: May 12, 2020

(54) FLYWHEEL ENERGY STORAGE DEVICE AND METHOD OF ITS USE

(71) Applicant: NIORE IP, S.R.O., Oponice (SK)

(72) Inventor: Miroslav Novák, Oponice (SK)

(73) Assignee: NIORE IP, S.R.O. (SK)

( * ) Notice: Subject to any disclaimer, the term of this patent is extended or adjusted under 35 U.S.C. 154(b) by 44 days.

(21) Appl. No.: 16/077,006

(22) PCT Filed: Feb. 13, 2017

(86) PCT No.: PCT/IB2017/050796
§ 371 (c)(1),
(2) Date: Aug. 9, 2018

(87) PCT Pub. No.: WO2017/141152
PCT Pub. Date: Aug. 24, 2017

(65) Prior Publication Data
US 2019/0032643 A1    Jan. 31, 2019

(30) Foreign Application Priority Data
Feb. 15, 2016  (EP) ..................................... 16155740

(51) Int. Cl.
F03G 3/08       (2006.01)
H02K 7/02       (2006.01)
(Continued)

(52) U.S. Cl.
CPC ................ F03G 3/08 (2013.01); F03B 13/14 (2013.01); F03B 17/062 (2013.01); F03D 3/005 (2013.01);
(Continued)

(58) Field of Classification Search
CPC ... F03D 3/005; F03D 9/11; F03D 9/12; F03D 9/25; F03B 13/14; F03B 17/062;
(Continued)

(56) References Cited

U.S. PATENT DOCUMENTS 4,466,245 A * 8/1984 Arold ...................... F01D 15/00
                                                    415/80
5,012,694 A * 5/1991 McGrath ................. F16F 15/30
                                                   74/572.11
(Continued)

FOREIGN PATENT DOCUMENTS

CA      2391486 A1    5/2001
DE   102005044123 A1  4/2007
(Continued)

OTHER PUBLICATIONS

International Search Report and Written Opinion from Corresponding PCT/IB2017/050796 dated May 15, 2017 (10 pages).

Primary Examiner — Jermele M Hollington
Assistant Examiner — Rashad H Johnson
(74) Attorney, Agent, or Firm — Hovey Williams LLP

(57) ABSTRACT

A flywheel energy storage device containing at least one rotary element (1) which is capable of floating and rotating on liquid and/or in liquid, at least one element which is capable of transferring energy onto the rotary element (1) and at least one generator (3) which is capable of transferring the energy from the rotary element (1) wherein the rotary element (1) is axleless. A method of use of the flywheel energy storage device in such manner that the energy is accumulated as kinetic energy of at least one rotary element (1) that floats and rotates on liquid or in liquid.

14 Claims, 6 Drawing Sheets

Figure 1:
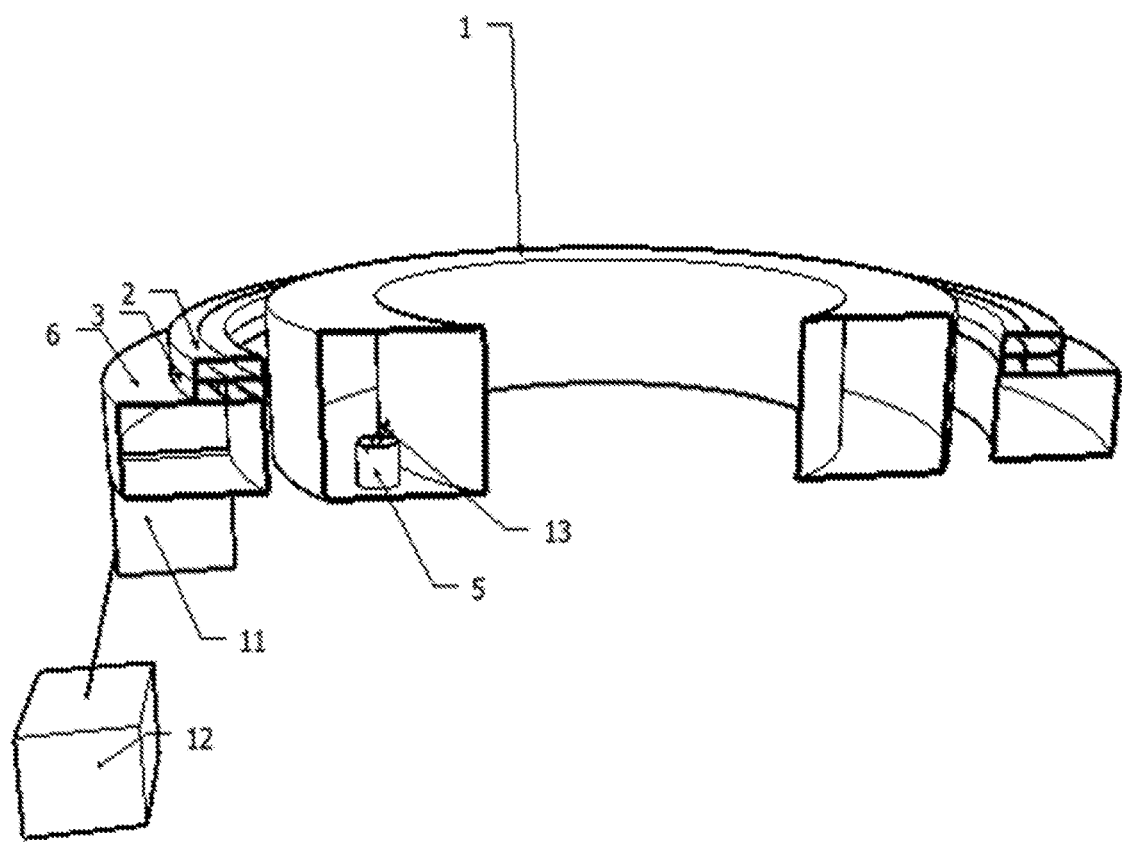

(51) Int. Cl.
*H02S 10/10* (2014.01)
*F03D 9/11* (2016.01)
*F03D 9/12* (2016.01)
*F03D 9/25* (2016.01)
*F03B 13/14* (2006.01)
*F03B 17/06* (2006.01)
*F03D 3/00* (2006.01)
*F16F 15/31* (2006.01)
*H02K 7/18* (2006.01)

(52) U.S. Cl.
CPC ............... *F03D 9/11* (2016.05); *F03D 9/12* (2016.05); *F03D 9/25* (2016.05); *F16F 15/31* (2013.01); *H02K 7/025* (2013.01); *H02K 7/183* (2013.01); *H02K 7/1823* (2013.01); *H02S 10/10* (2014.12); *Y02E 60/16* (2013.01); *Y02E 70/30* (2013.01)

(58) Field of Classification Search
CPC ........... F03G 3/08; F16F 15/31; H02K 7/025; H02K 7/1823; H02K 7/183; Y02E 60/16; Y02E 70/30
USPC .............. 310/74; 290/42, 43, 52, 53, 54
See application file for complete search history.

(56) References Cited

U.S. PATENT DOCUMENTS

| | | | |
|---|---|---|---|
| 5,559,381 A | | 9/1996 | Bosley et al. |
| 5,595,358 A | * | 1/1997 | Demidov ................ B64C 29/02 244/12.2 |
| 5,636,509 A | * | 6/1997 | Abell ...................... F02C 3/165 415/63 |
| 6,182,531 B1 | * | 2/2001 | Gallagher ............. F01D 21/045 464/101 |
| 8,698,365 B2 | * | 4/2014 | Hull ...................... F16F 15/315 310/74 |
| 9,997,976 B2 | * | 6/2018 | Lawson, II ............ H02K 7/102 |
| 10,047,717 B1 | * | 8/2018 | Phillips ................. H02K 7/1892 |
| 2006/0192387 A1 | * | 8/2006 | Fielder ................... F03B 17/061 290/1 R |
| 2013/0313833 A1 | * | 11/2013 | Bang .................... F03B 17/063 290/54 |

FOREIGN PATENT DOCUMENTS

| | | |
|---|---|---|
| EP | 2703645 A1 | 3/2014 |
| GB | 2463534 A | 3/2010 |
| WO | 03017449 A2 | 2/2003 |
| WO | 2008038055 A1 | 4/2008 |
| WO | 2011008153 A1 | 1/2011 |
| WO | 2012127194 A2 | 9/2012 |

* cited by examiner ical field

FLYWHEEL ENERGY STORAGE DEVICE AND METHOD OF ITS USE

RELATED APPLICATIONS

This application is the National Stage of International Patent Application No. PCT/IB2017/050796, filed Feb. 13, 2017, which is hereby incorporated herein by reference in its entirety, and which claims priority to European Patent Application No. 16155740.0, filed Feb. 15, 2016, which is also incorporated herein by reference in its entirety.

TECHNICAL FIELD

The invention relates to a flywheel energy storage device and method of its use, a flywheel energy storage device system and method of its use and belongs to the field of energetics.

BACKGROUND ART

At present, we recognize four basic methods of electric energy storage: pumped hydroelectric energy storage, chemical cell (battery), compressed air energy storage and flywheel.

Competitive use of flywheel as energy storage device is hampered by the high investment costs related to the flywheel construction materials being heavy steel or light, though durable, carbon-fiber composite. The amount of accumulated energy is proportional to the flywheel mass and its velocity squared, so doubling its mass increases the energy twice but doubling the velocity increases the energy fourfold. High mass represents enormous demands on the flywheel bearing. With declining prices of permanent magnets, transition from ball bearings to magnetic levitation has been observed. High rotation of flywheel causes losses due to air friction, therefore rotary flywheel must be enclosed in vacuum container. Such casing must be sufficiently resistant against possible destruction of the flywheel because of extreme centrifugal forces acting on the rotary flywheel.

Moreover, flywheel rotating for prolonged period of time is affected by gyroscopic effect caused by rotation of Earth around its axis while the flywheel tends to maintain its own orientation of its axis of rotation, which give rise to undesired forces acting on the bearing. Deflection of the flywheel's axis of rotation represents 360° per 24 hours, i.e. 15° per one hour, which cannot be neglected as these forces cause undesired friction at the axis of the flywheel and thereby cause losses in energy storage efficiency.

The amount of accumulated energy is proportional to the mass of the flywheel, therefore it is desired that the flywheel has variable mass and thus also variable angular momentum. Flywheels solving the problem of the variable angular momentum by filling hollow flywheel with a liquid are known, e.g. from WO/2012/127194 or GB2463534.

However, construction of energy storage device with variable capacity significantly exceeding 1 MWh (3.6 GJ) still faces the following technological barriers:
high cost of flywheel composite materials;
required durability of the flywheel protective casing;
required drive shaft strength; and
undesired gyroscopic effect.

These technological barriers cause that the possible increase in capacity does not lead to the required reduction of energy density and, more importantly, to reduction of costs per stored energy unit required to allow this method of energy storage become competitive.

NATURE OF INVENTION

The aforementioned disadvantages are significantly eliminated by an flywheel energy storage device and method of its use.

A flywheel energy storage device according to this invention contains at least one rotary element which is capable of floating and rotating on liquid and/or in liquid, at least one element which is capable of transferring energy onto the rotary element and at least one generator which is capable of transferring the energy from the rotary element. The nature of the invention lies in that the rotary element is axle-less.

In order to achieve higher efficiency of the flywheel energy storage device, it is preferable if the axle-less rotary element is at least partially hollow and at least partially fillable with liquid, preferably the water on or in which it floats.

The axle-less rotary element of the flywheel energy storage device can be provided with at least one opening. Preferably, the opening is arranged on the rotary element in such manner that when the rotary element is on or in liquid, at least a lower edge of the opening is below the level of liquid. Even more preferably, the opening is arranged on the rotary element in such manner that it is closer to the axis of rotation of the rotary element than an inside part of the outer wall of the rotary element, thereby allowing the rotary to autonomously change its mass through filling and discharging of liquid according to the size of the centrifugal force caused by the rotary element.

The opening can have one or more valves. The opening allows for simple manipulation with the rotary element and one or more valves allow for controlled operation of filling and discharging of the liquid to and from the rotary element.

In one preferred embodiment, the element which is capable of transferring the energy onto the rotary element is an engine. The energy can be kinetic energy or energy from outer sources.

In another preferred embodiment, the element being capable of transferring the energy onto the rotary element is a convertor. The convertor is connected to the rotary element. The convertor is capable of converting flow and/or wave motion of the liquid or wind motion into rotational kinetic energy of rotary element.

In still another preferred embodiment, the flywheel energy storage device according to this invention comprises the axle-less rotary element, at least one convertor, the generator and the engine. The convertor is connected to its own rotary element which is capable of converting flow and/or wave motion of the liquid or wind motion into rotational kinetic energy of rotary element. The generator is connected to the rotary element which is capable of converting rotational kinetic energy of rotary element into electric energy. The engine is capable of transferring energy onto the rotary element wherein such energy is electric energy from the generator or from other sources.

In order to allow for the use of the flywheel energy storage device on open water surface, e.g. lake, dammed reservoir, or sea, it is preferable that it is equipped with at least one static element. This static element serves to prevent free movement of the rotary element on open water surface or to provide movement of the rotary element in the limited extent. Such static element can be an element capable of floating or incapable of floating. If the static element is capable of floating, it may be equipped with blades preventing rotation and/or a guying to the bottom and/or to the bank. If the static element is incapable of floating, it is placed at the bottom or at the bank.

The generator can be preferably placed on the rotary element or on the static element or on dry land or at the bottom of water area or water reservoir, alternatively, partially on dry land and partially at the bottom of water area or water reservoir.

The engine can be preferably placed on the rotary element or on the static element or on dry land or at the bottom of water area or water reservoir, alternatively, partially on dry land and partially at the bottom of water reservoir.

In order to simplify the structure of the flywheel energy storage device, the engine and the generator can be combined into a single engine/generator unit, which operates as both engine and generator and this engine/generator can preferably also operate as static element.

In one preferred embodiment, the engine is linear engine. In such embodiment, magnets of a rotary component of the linear engine are located on the rotary element at the contact plane of the rotary element with the static element and windings of the static component of the linear engine are located on the static element. Eventually, the windings of the static component of the linear engine are located on the rotary element at the contact plane of the rotary element and the static element and the magnets of the rotary component of the linear engine are located on the static element.

Any rotary element can further comprise at least one hydrofoil.

The method of storing the energy using the flywheel energy storage device according to this invention is that the energy is based on that the energy accumulated as kinetic energy of at least one rotary element that floats and rotates on or in liquid.

In one preferred embodiment, with increasing need of energy storage, at least one rotary element fillable with liquid material is filled with liquid material, wherein with increasing amount of the liquid material, the energy storage device becomes heavier and thereby it is capable of storing more energy while with energy discharge at least one rotary element is being emptied.

The rotary element can have segmented structure, i.e. it consists of interconnected segments. The mutual connections between the respective segments can be provided as fixed, immobile, but also, e.g., via rotary hinge. In such case, for example upon the impact of a sea wave, the segment of the rotary element slightly rises, and thus does not transmit the force of the wave to the whole device.

The rotary element can be equipped with an artificial shallow water element in the shape of lateral surface of truncated cone. This artificial shallow water element can be attached to the outer side of the rotary element and at least partially immersed in water. The artificial shallow water element carries the elements of a water wave energy convertor, i.e. wave turbine. The convertor can be water turbine, wind turbine, wave turbine.

When using the artificial shallow water element, deep water wave is transformed into shallow water wave and the energy of this shallow water wave is transformed, via the elements of the convertor, into rotation motion of the rotary element.

The system for generation and storage of excess energy with the flywheel energy storage device includes an energy device for generation of electric energy, such as photovoltaic cells, water turbine, wind turbine, wave turbine as well as measuring device, research device.

The system for generation and storage of excess energy with flywheel storage device can be used in such manner that wind energy from the wind turbine and/or water energy from the water turbine is transferred onto the rotary element.

The presented invention solves the problem of energy storage using flywheel in order to transform excess electric energy to kinetic energy of the flywheel and subsequently to transform it into electric energy at the time of demand for the electric energy.

The flywheel energy storage device with axle-less rotary element according to this invention resolves the following disadvantages of the hitherto known solutions:
high costs of flywheel composite materials;
required durability of the flywheel protective casing;
required drive shaft strength; and
undesired gyroscopic effect.

OVERVIEW OF FIGURES IN DRAWINGS

The FIG. 1 shows cross-section of the rotary and the static element.

Figure 2:
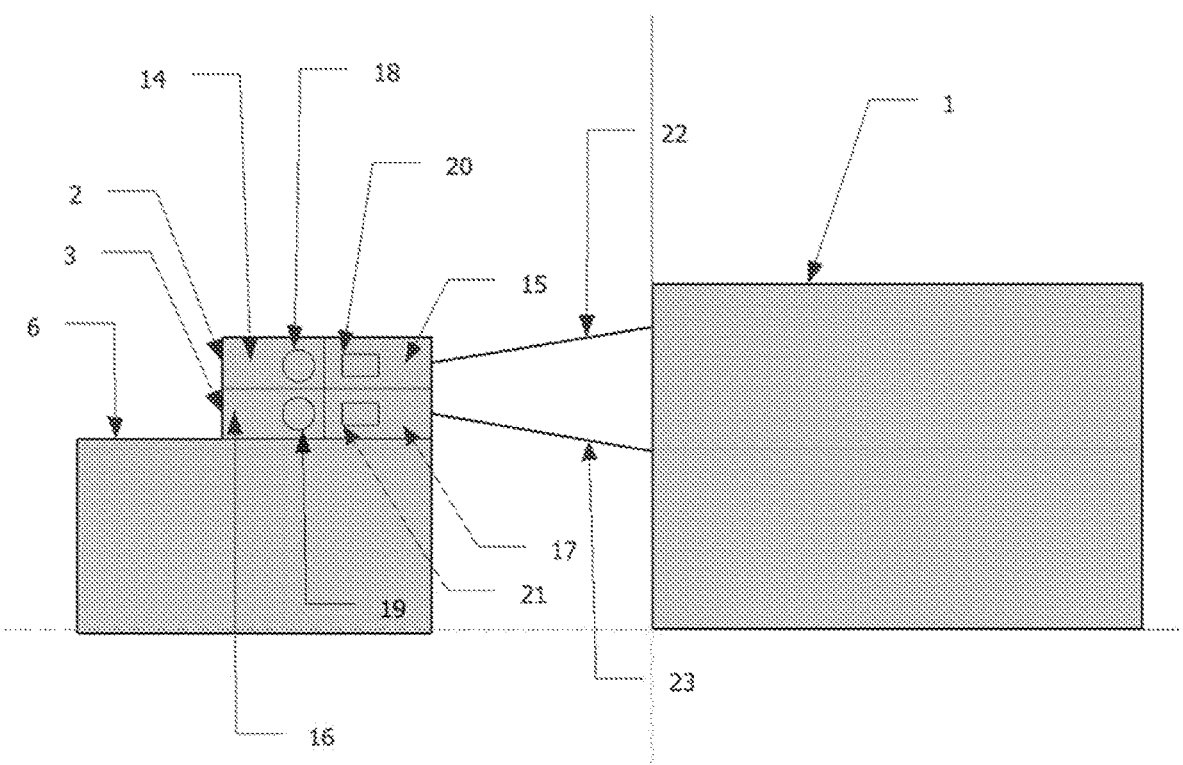

The FIG. 2 shows detail of the engine and the generator and their static and rotary components.

Figure 3:
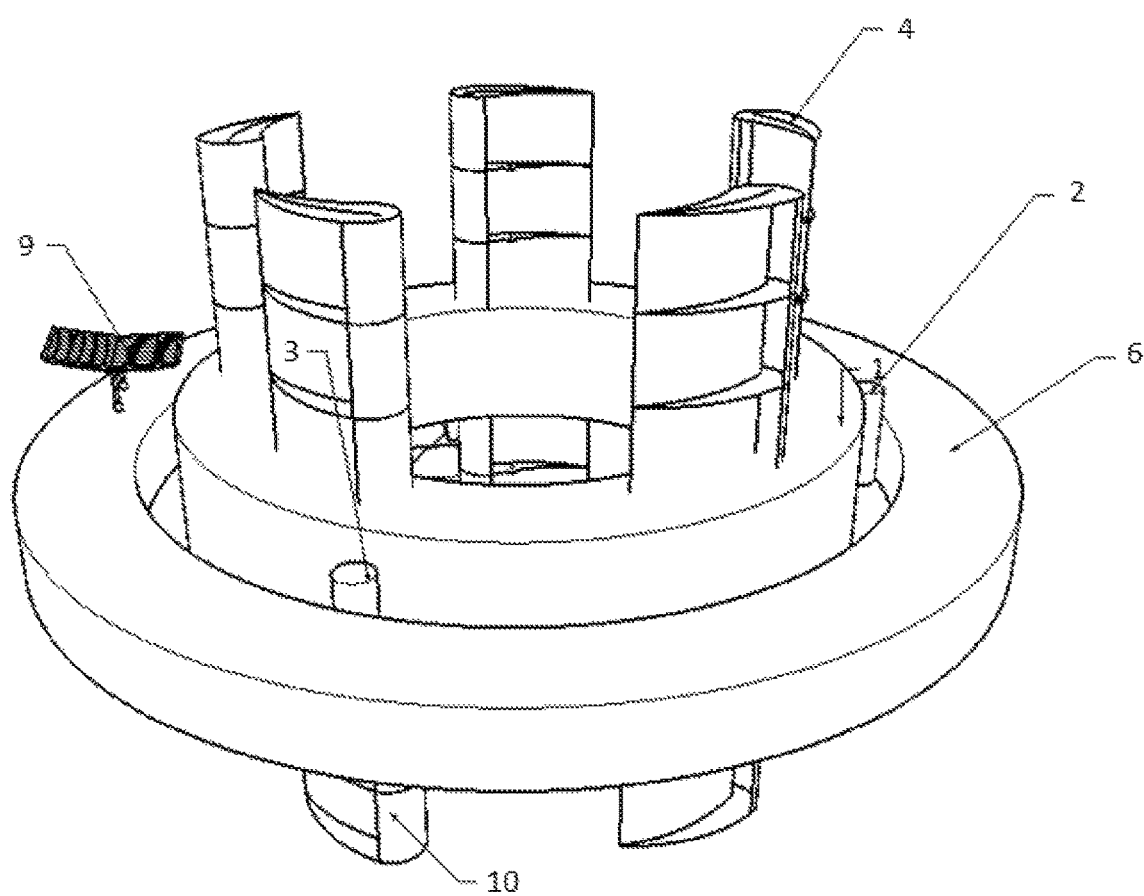

The FIG. 3 shows the energy storage device equipped with photovoltaic panel, wind and tide turbine.

Figure 4:
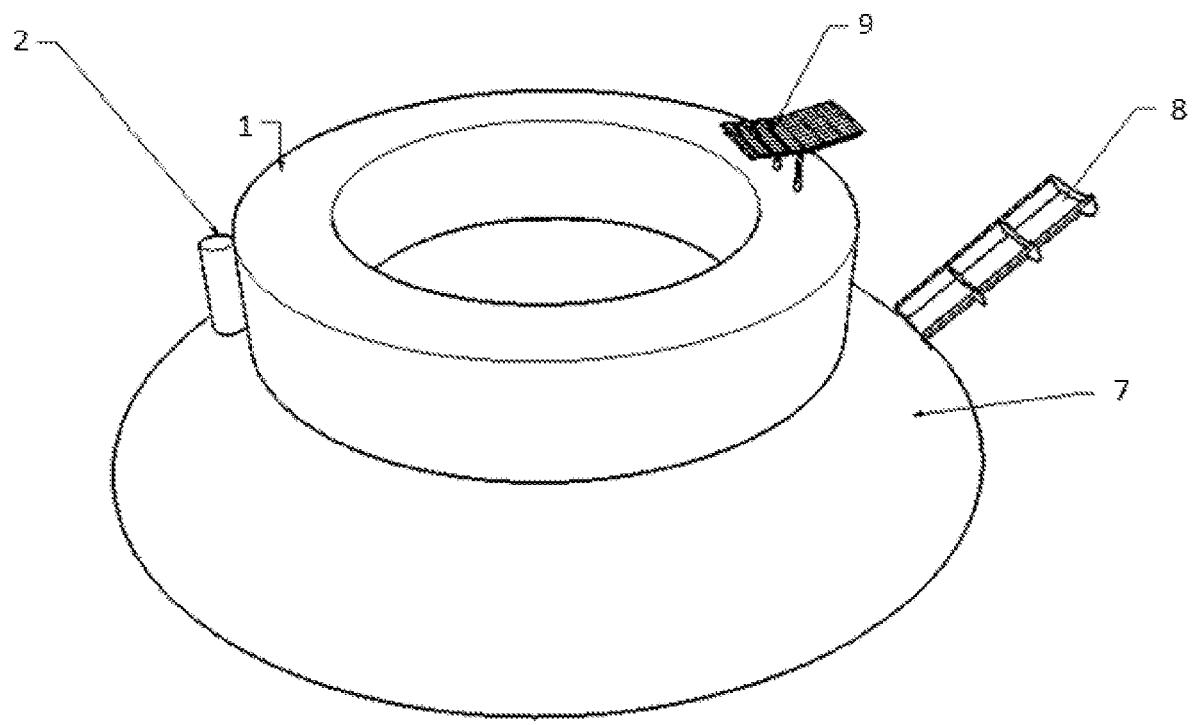

The FIG. 4 shows the energy storage device with sea wave conversion system.

Figure 5:
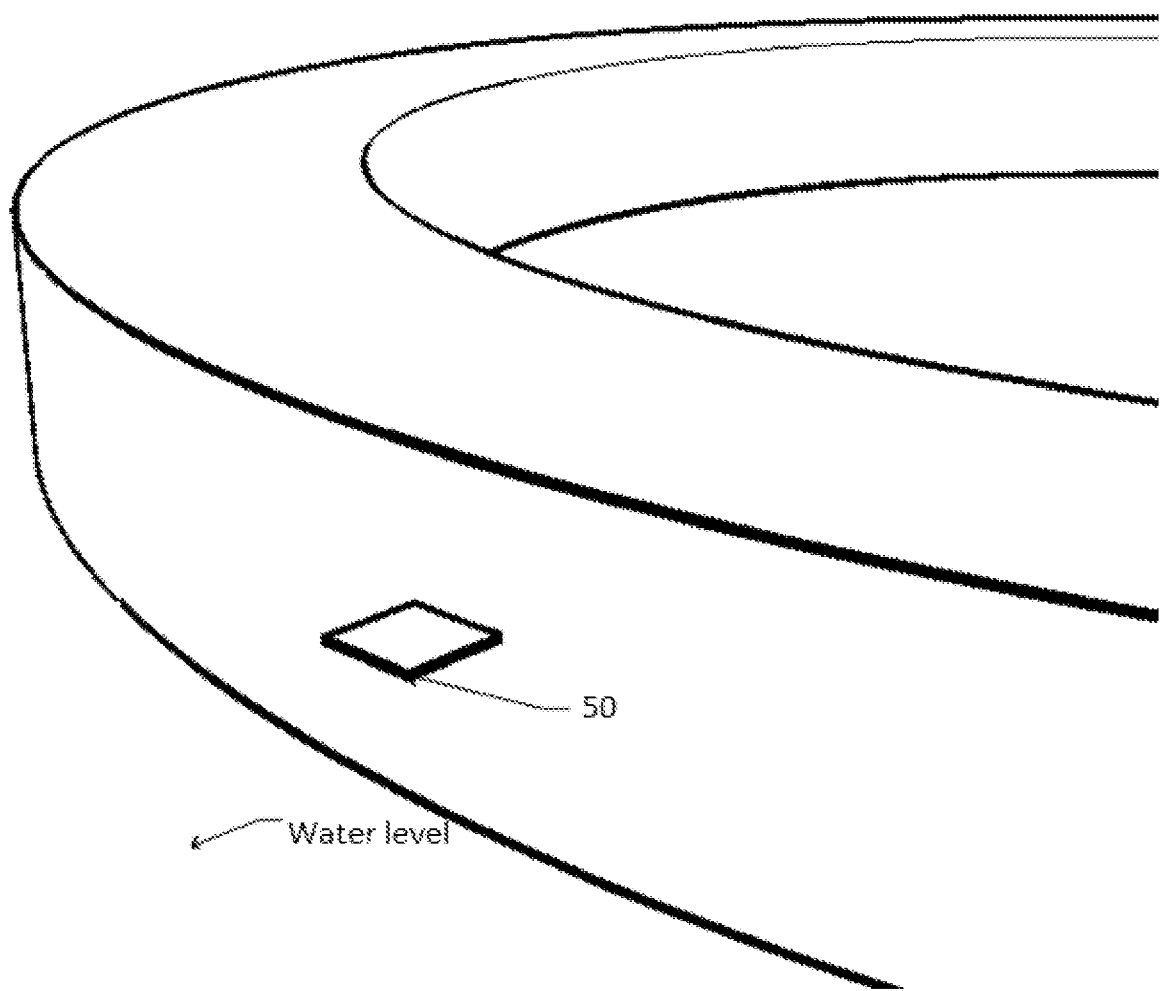

The FIG. 5 shows the energy storage device with hydrofoil.

Figure 6:
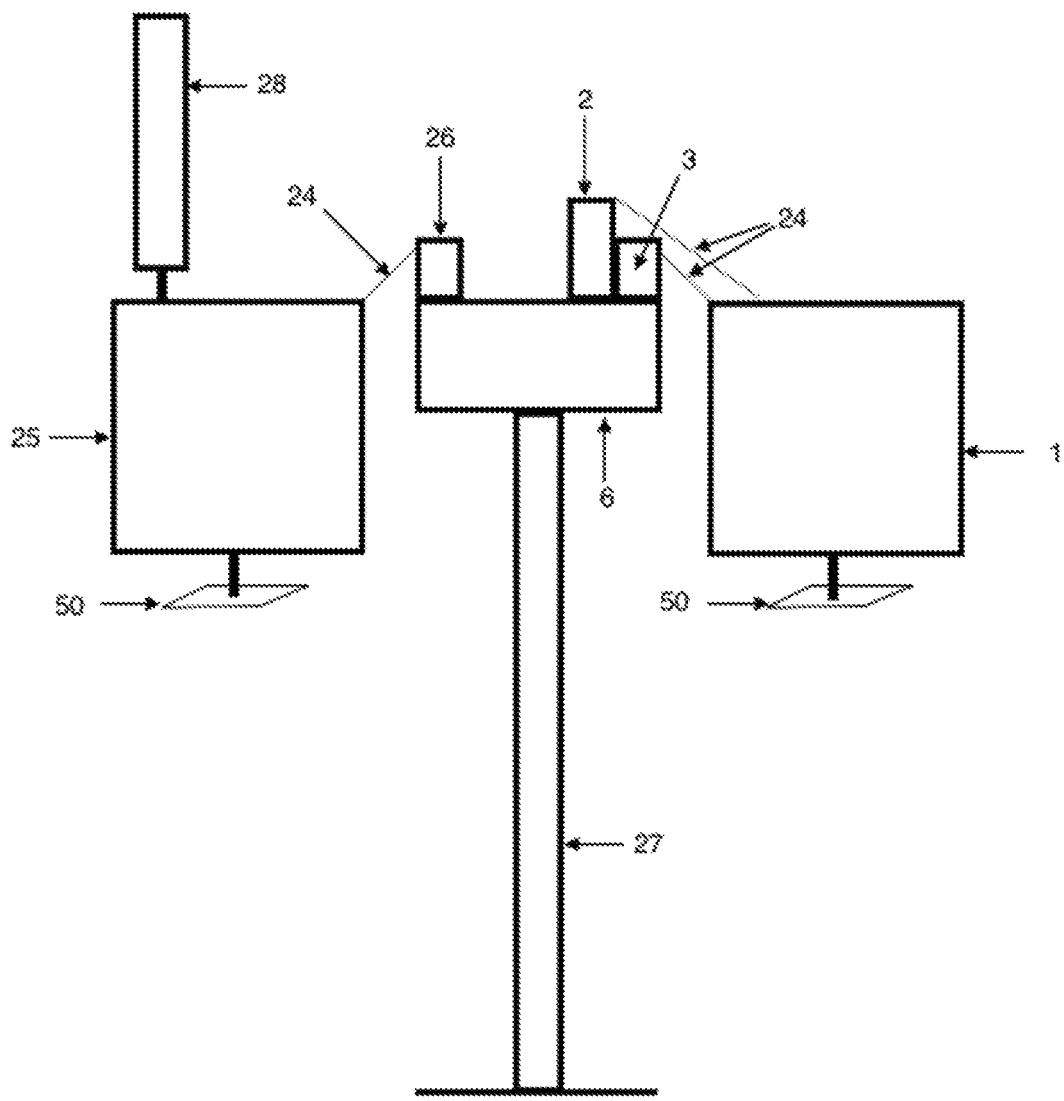

The FIG. 6 shows cross-section of the energy storage device with two rotary elements.

EXAMPLES OF EMBODIMENTS

The invention is further explained in detail by way of examples.

Example No. 1

A flywheel energy storage device was constructed comprising one rotary element 1, one independent engine 2 and one independent generator 3.

The rotary element 1 is axleless. The rotary element 1 is made of LDPE (low density polyethylene) material with specific mass lower than that of fresh water. The rotary element 1 floats on the water surface of circular artificial water reservoir made of solid material such as concrete, sheet metal and the like. The walls of the artificial water reservoir represent limits of movement of the rotary element 1. The rotary element 1 is hollow and can be filled with liquid material. In this case, the liquid material is water that the rotary element 1 floats on. On its inner side, the rotary element 1 having four openings 5 arranged symmetrically in a circle so that these openings 5 of the floating rotary element 1 are below the water surface. The opening 5 are arranged on the rotary element 1 in such manner that they are closer to the axis of rotation of the rotary element 1 than an inside part of the outer wall of the rotary element 1. Autonomous change of mass of the rotary element 1 through the filling and discharging of liquid according to the size of the centrifugal force caused by the rotary element 1.

The engine 2 and the generator 3 that are used have diameter larger than the rotary element 1. Both the engine 2 and the generator 3 have rotary component 15, 17, and static component 14, 16. Diameter of the engine 2 is identical to the diameter of the generator 3. The engine 2 transfers the energy onto the rotary element 1 and the generator 3 transfers the energy from the rotary element 1. The static component 14 of the engine 2 is attached to the bank of the artificial reservoir and the static component 16 of the generator 3 is attached above the engine 2, the static components 14 or 16 hold the windings 18 of the engine 2 or the windings 19 of the generator 3, respectively. The rotary component 15 of the engine 2 and the rotary component 17 of the generator 3 contains magnets 20 or 21, respectively. Both the rotary component 15 of the engine 2 and the rotary component 17 of the generator 3 are coupled with the rotary element 1 using rope 22 or 23, respectively. The electric energy being stored is brought to the windings of the engine 2, thereby inducing electromagnetic field pushing apart the magnets of the rotary component 15 of the engine 2.

Upon delivery of the first energy, the engine 2 spins the rotary element 1, and thus transforms the electric energy into rotary motion. With increasing rotation rate of the rotary element 1, the water inside the rotating rotary element 1 is pushed, by centrifugal force, to the outer wall, which again produces inequality between the water level inside the rotary element 1 and the water level outside. Increase of mass of water inside the rotary element 1 will cause immersion of the rotary element 1 because of increased overall mass of the rotary element 1 and, with the centrifugal effect of the water on the outer wall inside the rotary element 1, the overall angular momentum of the rotary element 1 also increases. Discharge of energy is performed when the generator 3 generates the electric energy. Through energy generation, the generator 3 slows down the rotary element 1 via the coupled ropes. By decrease of energy of rotation, the rotary element 1 slows down and the centrifugal force acting on the water inside the rotary element 1 is reduced and the water reaches higher level than the surface of water that the rotary element 1 floats on and tends to balance this inequality by spontaneous discharge from the rotary element 1 through the openings 5.

The artificial water reservoir can be located at the bottom of a lake, dammed reservoir, river, sea, or ocean, or it can be placed on the ground or at bottom of an excavated pit in the ground. The artificial water reservoir can be constructed so that its buoyancy makes it able to float, such as circular boat placed on the surface of a lake, dammed reservoir, river, sea, or ocean, or an artificial water surface created by excavating a circular pit in the ground.

Example No. 2

A flywheel energy storage device was constructed comprising one rotary element 1, one independent engine 2 and one convertor 4.

The rotary element 1 is axleless. The rotary element 1 has toroidal shape (with circular cross-section), is made of LDPE (low density polyethylene) material with specific mass lower than that of fresh water. The rotary element 1 floats on the water surface of circular artificial water reservoir made of solid material such as concrete, sheet metal and the like. The walls of the artificial water reservoir represent limits of movement of the rotary element 1. The rotary element 1 is hollow and can be filled with liquid material. In this case, the liquid material is water that the rotary element 1 floats on.

The opening 5 has a valve 13 and is arranged on the rotary element 1 in such manner that when the rotary element 1 is on or in liquid, at least a lower edge of the opening 5 is below the level of liquid. At the same time, the opening 5 is closer to the axis of rotation of the rotary element 1 than an inside part of the outer wall of the rotary element 1. Autonomous change of mass of the rotary element 1 through the filling and discharging of liquid according to the size of the centrifugal force caused by the rotary element 1.

The convertor 4 is converting flow and wave motion of liquid. It is connected to the rotary element 1. The convertor 4 transfers the energy of liquid onto the rotary element 1 and the generator 3 transfers the energy from the rotary element 1.

The convertor 4 is converting energy of wind motion. It is connected to the rotary element 1. The convertor 4 transfers the energy of wind motion onto the rotary element 1 and the generator 3 transfers the energy from the rotary element 1. The generator 3 has larger diameter than the rotary element 1.

Example No. 3

A flywheel energy storage device was constructed comprising one rotary element 1, one independent engine 2 and convertor 4 and one independent generator 3. The convertor 4 has four openings. The flywheel energy storage device has features of Examples Nos. 1 and 2.

Example No. 4

A flywheel energy storage device was constructed comprising one rotary element 1, one convertor 4, and one independent generator 3. The flywheel energy storage device in such configuration only transforms energy from the convertor 4 directly into the rotary movement of the rotary element 1 without using electric energy from any other source to spin the rotary element 1.

Example No. 5

A flywheel energy storage device as shown in FIG. 6 was constructed. It comprises one rotary element 1, one independent engine 2, a wind convertor 28 of VAWT type connected to the rotary element 25, a generator 26 which is capable of converting rotational kinetic energy of rotary element 25 into electric energy, and one independent generator 3. On the bottom side of the rotary elements 1, 25, 40 hydrofoils 50 are arranged. With increasing rotational speed of the rotary elements 1, 25, the hydrofoils 50 by their hydrolift force cause floating of the rotary elements 1, 25 above the water level and thus reduce rapidly the viscous friction of the water against the wall of the rotary elements 1, 25. The wind energy convertor 28 of VAWT type spins the rotary element 25 by action of wind energy. On the basis of these rotations, the generator 26 produces electric energy by means of ropes 24 which is sent either to the engine 2 that, by means of ropes 24, spins adequately the rotary element 1 or the electric energy is transferred into the distribution network. Even in such case, the engine 2 can use the energy from other sources to spin the rotary element 1. The generator 3, the generator 26 and the engine 2 are located on the stator 6. The stator 6 is formed by circular element placed on pylons 27 attached to the bottom of water reservoir.

Example No. 6

A flywheel energy storage device was constructed according to the Example no. 5 except that the generator 3 and the engine 2 are arranged on the rotary element 1, the generator 26 is arranged on the rotary element 25 and electric energy is transmitted on the stator 6 by a bus-bar in form of traction lines as it is, for example, in case of electric train. This example of embodiment is less preferred than Example no. 5.

Example No. 7

A flywheel energy storage device was constructed according to the Example no. 5 and 6 except that this flywheel energy storage device is performed around the natural island where the coast of the island forms the basis for anchoring the stator 6. In case that the island has non-circular shape, the stator 6 can interfere with water level in some places, so in these places it is fastened only partially or, alternatively, only to the end of the sea. The generator 3, the generator 26, and the engine 2 are located on the stator 6.

Example No. 8

It is identical to the example of embodiment No. 1, except that it includes a guying 12. In this case, the static element 6 is a pontoon that can be of circular shape and can be guyed to the bank or the bottom of the water reservoir, artificial or natural, using ropes or rods that prevent its rotation. To the guying 12 the engine 2 and the generator 3 are attached. The diameter of the guying 12 is higher than that of the rotary element 1.

Example No. 9

It is identical to the example of embodiment No. 3 but instead of guying 12, the pontoon which is of circular shape comprises blades 11 positioned so that they significantly increase the viscous friction of the pontoon, thereby preventing rotation of the pontoon.

Example No. 10

Further example of embodiment involves use of two rotary elements 1. One of them is larger than the other. They are placed on the surface of the liquid so that both rotary elements 1 float concentrically on the surface of the liquid and rotate in opposite directions. The energy transfer is achieved using the engine 2 and the generator 3 as a single device, i.e. engine/generator, which is anchored between these two rotary elements 1. The energy delivered by a busbar onto one of the rotary elements 1 causes spinning of the other rotary element 1. The law of action and reaction causes the spinning of the other rotary element 1. Transfer of energy from the flywheel energy storage device is provided by the same two-in-one engine/generator unit.

The amount of the energy stored in the flywheel energy storage device is determined by the equation:

$$E = \frac{1}{2} m v2,$$

where m is the mass of the rotary element 1,
v is the circumferential velocity of the center of gravity of the rotary element 1.

Example No. 11

Another example of embodiment is floating rotary element 1 which floats on the water surface inside a guyed floating pontoon and the rotary element 1 carries wind turbine elements. The floating rotary element 1 creates bearing of the wind turbine with vertical axis of rotation. The power of the wind is converted to rotary motion of the rotary element 1. On the other hand, energy of rotation is transformed by the generator 3 into electric energy.

Similarly, the power of flowing water (river, high tide, low tide, ocean current, water wave) can be converted using a water turbine attached to the rotary element 1.

Example No. 12

Another example of use is the floating rotary element 1 which floats on the water surface and is equipped with artificial shallow water element 7 in the shape of lateral surface of truncated cone, preferably attached on the outer side of the rotary element 1 and immersed, at least partially, in water and with elements of water wave energy convertor 8, i.e. wave turbine, placed on the artificial shallow water element 7. Sea wave, produced by atmospheric storm and wind processes, is propagated on the water surface as deep water wave, wherein the difference between the highest and the lowest wave point is not as significant as in the case when the wave hits the shallow coast and becomes a shallow water wave. Such effect is achieved using the artificial shallow water element 7 when the wave impacts the element 7, thereby increasing the difference between the lowest and the highest wave point, which results in increased efficiency of transformation of the wave energy into rotary motion of the element 1 using the elements of the convertor 8.

Example No. 13

Another example of use is the floating static element 6, which floats on the water surface and carry structures with photovoltaic panels 9, producing electric energy from sunlight, the floating rotary element 1 carries the wind turbine elements, converting the wind energy to rotary motion of the rotary element 1, and tide turbine 10 elements, converting the energy of high and low tide, or alternatively of ocean current or of river stream, to rotary motion of the rotary element 1. The device can include any apparatus for measurement, e.g. of temperature of air and water, wind speed, or water flow, or other atmospheric and hydrologic parameters such as amount of $CO_2$.

Example No. 14

Another example of use is the rotary element 1, provided with four hydrofoils 50, symmetrically situated around the circuit of the rotary element 1 so that in the case of no revolution (centrifugal force is null, in the rotary element 1 is minimum of water, the rotary element 1 has minimum mass and is maximally surfaced above water), these hydrofoils 50 are above water and do not act by their buoyancy effect on the rotary element 1. In case of high revolutions, when enough liquid flows into the rotary element 1 by the centrifugal force and the rotary element 1 is immersed by its own weight in a such manner that the hydrofoil 50 is already in the contact with water surface, the hydrodynamic power of the hydrofoils 50 starts to act against further immersion of the rotary element 1 into the water, so the viscous friction of the rotary element 1 in the water will no longer increase.

The invention claimed is:

1. A flywheel energy storage device containing at least one rotary element which is capable of floating and rotating on liquid or in liquid, at least one element which is capable of transferring energy onto the rotary element and at least one generator which is capable of transferring the energy from the rotary element, wherein:

(i) the rotary element is axleless;
(ii) the rotary element is at least partially hollow and at least partially fillable with liquid; and
(iii) the rotary element is provided with at least one opening arranged on the rotary element in such manner that when the rotary element is on or in liquid, at least a lower edge of the opening is below the level of liquid, while the opening is arranged on the rotary element in such manner that it is closer to the axis of rotation of the rotary element than an inside part of an outer wall of the rotary element, thereby allowing the rotary element to autonomously change its mass through filling and discharging of liquid according to the size of the centrifugal force caused by the rotary element.

2. The flywheel energy storage device according to claim 1 wherein the element which is capable of transferring the energy onto the rotary element is an engine.

3. The flywheel energy storage device according to claim 2 further comprising:
(i) at least one convertor being connected to its own rotary element which is capable of converting flow and/or wave motion of the liquid or wind motion into rotational kinetic energy of rotary element; and
(ii) a generator being connected to the rotary element which is capable of converting rotational kinetic energy of rotary element into electric energy.

4. The flywheel energy storage device according to claim 3 wherein the rotary element further comprises at least one hydrofoil.

5. The flywheel energy storage device according to claim 2 wherein the engine is placed on the rotary element or on static element or on dry land or at the bottom of water area or water reservoir, alternatively, partially on dry land and partially at the bottom of water reservoir.

6. The flywheel energy storage device according to claim 2, wherein the engine and the generator are combined into a single engine/generator unit which operates as both engine and generator and this engine/generator unit also operates as static element.

7. The flywheel energy storage device according to claim 2 wherein the engine is a linear engine and magnets of a rotary component of the linear engine are located on the rotary element at the contact plane of the rotary element with static element, and windings of the static component of the linear engine are located on the static element, or the windings of the static component of the linear engine are located on the rotary element at the contact plane of the rotary element and the static element and the magnets of the rotary component of the linear engine are located on the static element.

8. The flywheel energy storage device according to claim 1 wherein the element being capable of transferring the energy onto the rotary element is a convertor which is connected to the rotary element, the convertor is capable of converting flow and/or wave motion of the liquid or wind motion into rotational kinetic energy of the rotary element.

9. The flywheel energy storage device according to claim 1 further comprising at least one static element which is capable of floating and optionally contains blades preventing rotation and/or a guying to the bottom and/or to the bank.

10. The flywheel energy storage device according to claim 1 further comprising at least one static element which is not capable of floating and is placed at the bottom and/or at the bank.

11. The flywheel energy storage device according to claim 1 wherein the generator is placed on the rotary element or on static element or on dry land or at the bottom of water area or water reservoir, alternatively, partially on dry land and partially at the bottom of water area or water reservoir.

12. The flywheel energy storage device according to claim 1 wherein the rotary element further comprises at least one hydrofoil.

13. A method of use of the flywheel energy storage device according to claim 1 wherein the energy is accumulated as kinetic energy of at least one rotary element that floats and rotates on liquid or in liquid.

14. The method according to claim 13 wherein with increasing need of energy storage, at least one rotary element fillable with liquid material is filled with liquid material, wherein with increasing amount of the liquid material, the energy storage device becomes heavier and thereby it is capable of storing more energy while with energy discharge at least one rotary element is being emptied.

\* \* \* \* \*